US011799343B2

(12) United States Patent
Lin

(10) Patent No.: US 11,799,343 B2
(45) Date of Patent: Oct. 24, 2023

(54) METHODS AND SYSTEMS FOR A FRACTIONAL CONCENTRATED STATOR CONFIGURED FOR USE IN ELECTRIC AIRCRAFT MOTOR

(71) Applicant: BETA AIR, LLC, South Burlington, VT (US)

(72) Inventor: Chenjie Lin, Fuquay-Varina, NC (US)

(73) Assignee: BETA AIR, LLC, South burlington, VT (US)

( * ) Notice: Subject to any disclaimer, the term of this patent is extended or adjusted under 35 U.S.C. 154(b) by 176 days.

(21) Appl. No.: 17/144,304

(22) Filed: Jan. 8, 2021

(65) Prior Publication Data

US 2022/0224179 A1 Jul. 14, 2022

(51) Int. Cl.
*H02K 3/28* (2006.01)
*H02K 3/50* (2006.01)
*H02K 1/12* (2006.01)

(52) U.S. Cl.
CPC ............... *H02K 3/28* (2013.01); *H02K 1/12* (2013.01); *H02K 3/50* (2013.01)

(58) Field of Classification Search
CPC .. H02K 3/28; H02K 1/12; H02K 3/50; H02K 16/005
See application file for complete search history.

(56) References Cited

U.S. PATENT DOCUMENTS 6,034,462 A * 3/2000 Woodward, Jr. ......... H02K 1/06
310/104
8,310,115 B2 11/2012 Elantably 8,987,968 B2 3/2015 Morishita
9,876,405 B2 1/2018 Han
10,749,387 B2 8/2020 Sakuma
(Continued)

FOREIGN PATENT DOCUMENTS

EP  2922177 A1  9/2015
WO 2013124239 A2  8/2013
WO 2014117350 A1  8/2014

OTHER PUBLICATIONS

WO2013124239A2 English Translation (Year: 2022).*
(Continued)

*Primary Examiner* — Christopher M Koehler
*Assistant Examiner* — Viswanathan Subramanian
(74) *Attorney, Agent, or Firm* — CALDWELL INTELLECTUAL PROPERTY LAW

(57) ABSTRACT

A fractional concentrated stator for use in electric aircraft motor includes an inner and outer cylindrical surface about an axis of rotation comprising different radii. The stator includes a plurality of teeth disposed on the inner cylindrical surface and extending radially inward, the cross-sectional area of each tooth increasing as it extends from the inner cylindrical surface. The stator includes a plurality of modular winding sets, each comprising at least a segment of electrically conductive material wound upon at least a tooth, an inverter providing electrical power to a configurable portion of the stator, and rotor shaft at the axis of rotation disposed coaxially within the stator. The rotor shaft further includes a cylindrical surface facing the inner cylindrical surface of the stator, a plurality of magnets coupled to rotor shaft and coupled to a propulsor and an air gap between the rotor and stator.

20 Claims, 10 Drawing Sheets

(56) References Cited

U.S. PATENT DOCUMENTS

| | | | |
|---|---|---|---|
| 2006/0163962 A1* | 7/2006 | Shimada | F16C 37/005 |
| | | | 310/90.5 |
| 2010/0090549 A1 | 4/2010 | Gerstler | |
| 2015/0002063 A1* | 1/2015 | Fahimi | H02K 21/22 |
| | | | 318/400.41 |
| 2019/0288571 A1 | 9/2019 | Lehikoinen | |
| 2020/0385130 A1* | 12/2020 | Verna | B64D 27/24 |
| 2020/0385139 A1* | 12/2020 | Verna | H02K 7/085 |

OTHER PUBLICATIONS

WO2014117350A1 English Translation (Year: 2022).*
Reference Notes: https://www.praiseworthyprize.org/jsm/index.php?journal=irease&page=article&op=view&path%5B%5D=20553 Title:High-Temperature Starter-Generator with Fractional-Slot Concentrated Windings for More Electric Aircraft: Design and Testing of the Scaled-Size Prototype Date: 2017.
Reference Notes: https://ieeexplore.ieee.org/document/7113002 Title: Electromagnetic/thermal design procedure of an aerospace electric propeller Date: Jun. 1, 2015 By: Ikhlas Bouzidi.

* cited by examiner

METHODS AND SYSTEMS FOR A FRACTIONAL CONCENTRATED STATOR CONFIGURED FOR USE IN ELECTRIC AIRCRAFT MOTOR

FIELD OF THE INVENTION

The present invention generally relates to the field of electric aircraft. In particular, the present invention is directed to methods and systems for a stator with modular winding sets configured for use in electric aircraft motor.

BACKGROUND

In electric multi-propulsion systems such as electric vertical take-off and landing (eVTOL) aircraft, the propulsors are constrained by volumetric, gravimetric, and thermal concerns. Design and assembly of the propulsor units must be done in a manner which reduces volumetric, gravimetric, and thermal issues to enable efficient flight. Existing approaches to mitigating these issues are limited.

SUMMARY OF THE DISCLOSURE

In an aspect the present disclosure is directed to methods and systems for a fractional concentrated stator configured for use in electric aircraft motor. The fractional concentrated stator further comprising a stator including an inner and outer cylindrical surface about an axis of rotation wherein the inner and outer cylindrical surfaces comprise different radii and further comprise a coincident and parallel centerline. The stator further comprising a plurality of teeth disposed on the inner cylindrical surface and extending radially inward, wherein each tooth of the plurality of teeth has a cross-sectional area, the cross-sectional area increasing as the tooth extends further from the inner cylindrical surface. The stator further comprising a plurality of modular winding sets, each of the plurality of winding sets comprising at least a segment of electrically conductive material, in the form of wire, wound upon at least a tooth of the plurality of teeth. The stator further comprising at least an inverter wherein the inverter provides electrical power to at least a portion of the stator and the at least an inverter provides electrical power to a configurable portion of the stator. The electric motor further comprising a rotor shaft at the axis of rotation, the rotor shaft disposed coaxially within the stator and rotatable relative to the stator. The rotor shaft further comprising a cylindrical surface facing the inner cylindrical surface of the stator, a plurality of magnets mechanically coupled to rotor shaft and a first end of rotor shaft mechanically coupled to a propulsor. At least an air gap disposed between the outer cylindrical surface of the rotor shaft and the inner cylindrical surface of the stator.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 9. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to a fractional slot concentrated motor for electric aircraft, the motor including a stator. The stator includes an inner and outer cylindrical surface about an axis of rotation; the inner and outer cylindrical surfaces include different radii and the inner and outer cylindrical surfaces include a coincident and parallel centerline. The stator includes a plurality of teeth, a plurality of modular winding sets, and at least an inverter. The fractional slot concentrated motor for electric aircraft includes a rotor shaft at the axis of rotation, the rotor shaft disposed coaxially within the stator and rotatable relative to the stator and at least an air gap disposed between the outer cylindrical surface of the rotor shaft and the inner cylindrical surface of the stator.

Figure 1:
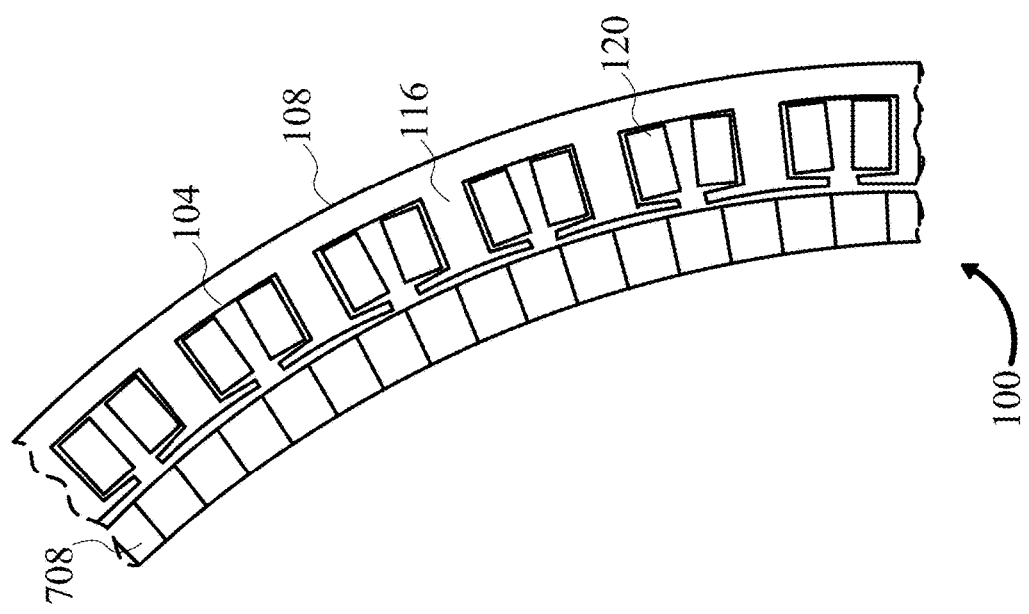
FIG. 1 is an embodiment of a portion of a stator assembly used in an electric motor assembly in partial planform view.

Referring now to FIG. 1, stator assembly 100 that may be incorporated in a concentrated fractional motor used in electric aircraft is presented. Stator assembly 100 may include inner cylindrical surface 104 and outer cylindrical surface 108 that share a coincident and parallel centerline disposed at the center of each cylindrical surface. Inner cylindrical surface 104 and outer cylindrical surface 108 may include different radii and thus include different sizes. Stator assembly 100 further includes a hollow cylinder bounded by inner cylindrical surface 104, outer cylindrical surface 108, and a first and second end disposed perpendicularly to the centerline opposite and opposing to each other. At least a portion of stator assembly 100 may be mechanically coupled to at least a portion of an electric aircraft, for instance and without limitation as described below with reference to FIG. 9.

With continued reference to FIG. 1, stator assembly 100 may further include plurality of teeth 116 disposed on inner cylindrical surface 104. Plurality of teeth 116 extend radially inward toward the centerline, but do not intersect with the centerline. The plurality of teeth 116 each comprise a cross-sectional area which increases as each tooth 116 extends further from inner cylindrical surface 104. Cross-sectional area may include a polygonal shape like a rectangle, square, circle, oval, or substantially similar shape. Additionally, tooth 116 may, in embodiments, be flanged. In other words, a portion of the plurality of teeth 116, which may be tooth 116 distal end, or section furthest from inner cylindrical surface 104, may include a flange that is wider than a middle portion of tooth 116, where a middle portion of a tooth is defined as a portion containing a cross-section that bisects a longitudinal axis of the tooth. Tooth 116 may include a flange that is extends transverse to tooth 116 longitudinal axis. One of ordinary skill in the art would understand tooth 116 longitudinal axis to extend from a proximal end of the tooth 116 at inner cylindrical surface 104 up to a distal end of tooth 116 which distal end is closer to the centerline than any other portion of tooth 116. Longitudinal axis may be a line bisecting tooth 116 in two halves of equal volume and symmetrical about axis. The flange may be disposed on the end of tooth 116 closest to the centerline. The flange disposed on tooth 116 may assist in securing and retaining at least a portion of modular winding sets 120 consistent with the entirety of the disclosure. One of ordinary skill in the art would understand that each tooth 116 may be radially symmetrical about the centerline, symmetrical about some other axis, or not symmetrical about any cross section. Plurality of teeth 116 may extend from a first end to a second end of stator assembly 100 or a portion thereof.

With continued reference to FIG. 1, stator assembly 100 includes a plurality of modular winding sets 120. Each of the plurality of modular winding sets 120 include at least a segment of electrically conductive material. The at least a segment of electrically conductive material may include a wire, filament, or other suitable material and configuration thereof to conduct electricity through it. At least a segment of electrically conductive material wound upon the tooth 116 may include Litz wires.

With continued reference to FIG. 1, each or any tooth 116 may be integral to stator assembly 100. Integral, for the purposes of this disclosure, refers to a part of the overall geometric shape or assembly that was manufactured as one piece from the stock material. For example, stator assembly 100 may be machine from a block of aluminum with plurality of teeth 116 being cut away with the hollow cylinder stator assembly 100 also comprises. Stator assembly 100 may be manufactured in a plurality of methods known in the art. For example only, stator assembly 100 manufacturing may include a subtractive manufacturing process, which produces the product by removing material from a workpiece; the removal of material may be accomplished using abrasives, cutting tools or endmills, laser cutting or ablation, removal using heat, or any other method that removes material from the workpiece. Subtractive manufacturing may be performed using water-jet or other fluid-jet cutting techniques. Fundamentally, any process for removal of material may be employed for subtractive manufacturing. Each subtractive manufacturing process used may be any suitable process, such as, but not limited to, rotary-tool milling, electronic discharge machining, ablation, etching, erosion, cutting, and cleaving, among others. Additionally, if rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In some embodiments, the milling equipment used for removing material may be of the computerized numerical control (CNC) type that is automated and operates by precisely programmed commands that control movement of one or more parts of the equipment to effect the material removal. CNC machines, their operation, programming, and relation to CAM tools and CAD tools are well known and need not be described in detail herein for those skilled in the art to understand the scope of the present invention and how to practice it in any of its widely varying forms. Subtractive manufacturing may be performed using spark erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using waterjet or other fluid jet cutting techniques. Fundamentally, any process for removal of material may be employed for subtractive manufacturing.

Manufacturing processes may include an additive manufacturing process, in which material is deposited on the workpiece. In some embodiments, an additive manufacturing process is a process in which material is added incrementally to a body of material in a series of two or more successive steps. The material may be added in the form of a stack of incremental layers; each layer may represent a cross-section of the object to be formed upon completion of the additive manufacturing process. Each cross-section may, as a non-limiting example be modeled on a computing device as a cross-section of graphical representation of the object to be formed; for instance, a computer aided design (CAD) tool may be used to receive or generate a three-dimensional model of the object to be formed, and a computerized process may derive from that model a series of cross-sectional layers that, when deposited during the additive manufacturing process, together will form the object. The steps performed by an additive manufacturing system to deposit each layer may be guided by a computer aided manufacturing (CAM) tool. In other embodiments, a series of layers are deposited in a substantially radial form, for instance by adding a succession of coatings to the workpiece. Similarly, the material may be added in volumetric increments other than layers, such as by depositing physical voxels in rectilinear or other forms. Additive manufacturing, as used in this disclosure, may specifically include manufacturing done at the atomic and nano level. Additive manufacturing also includes bodies of material that are a hybrid of other types of manufacturing processes, e.g. forging and additive manufacturing as described above. As an example, a forged body of material may have welded material deposited upon it which then comprises an additive manufactured body of material.

Deposition of material in additive manufacturing process may be accomplished by any suitable means. Deposition may be accomplished using stereolithography, in which successive layers of polymer material are deposited and then caused to bind with previous layers using a curing process such as curing using ultraviolet light. Additive manufacturing processes may include "three-dimensional printing" processes that deposit successive layers of power and binder; the powder may include polymer or ceramic powder, and the binder may cause the powder to adhere, fuse, or otherwise join into a layer of material making up the body of material or product. Additive manufacturing may include metal three-dimensional printing techniques such as laser sintering including direct metal laser sintering (DMLS) or laser powder-bed fusion. Likewise, additive manufacturing may be accomplished by immersion in a solution that deposits layers of material on the body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing or combine two or more methods. Companies producing additive manufacturing equipment include 3D Systems, Stratasys, formLabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Additive manufacturing may include deposition of initial layers on a substrate. Substrate may include, without limitation, a support surface of an additive manufacturing device, or a removable item placed thereon. Substrate may include a base plate, which may be constructed of any suitable material; in some embodiments, where metal additive manufacturing is used, base plate may be constructed of metal, such as titanium. Base plate may be removable. One or more support features may also be used to support additively manufactured body of material during additive manufacture; for instance and without limitation, where a downward facing surface of additively manufactured body of material is constructed having less than a threshold angle of steepness, support structures may be necessary to support the downward-facing surface; threshold angle may be, for instance 45 degrees. Support structures may be additively constructed and may be supported on support surface and/or on upward-facing surfaces of additively manufactured body of material. Support structures may have any suitable form, including struts, buttresses, mesh, honeycomb or the like; persons skilled in the art, upon reviewing the entirety of this disclosure, will be aware of various forms that support structures may take consistently with the described methods and systems. One or more manufacturing processes may include a molding and/or injection molding manufacturing process. Molding and/or injection manufacturing may include deposition of a fluid material which may include, without limitation, a molten material, into a mold, cast, die, or any other suitable form. Deposition of a molten material for molding manufacturing may include carbon fiber, ceramics, confections, elastomers, epoxies, glasses, metals, plastics, photopolymers, polymers, resins, rubbers, amongst other suitable materials. Fluid materials, including without limitation molten materials, may be injected into the cavity of a mold and/or die, made of steel, aluminum, beryllium-copper, amongst other materials, until cooled and/or formed; forming may include without limitation any process of solidifying, curing, or thickening fluids into an elastomeric, solid, or other suitable state by processing including without limitation cooling or allowing material to be cooled and/or undergo a phase change and/or any other process of curing materials as described above in additive manufacturing. Manufacturing to produce molds may be performed by standard machining, electric discharge machining (EDM), 3D printing, spark erosion, CNC machining, or any other suitable manufacturing method. Molds may be additively manufactured, subtractively manufactured, machined, or 3D printed. Injection of molten material may be performed by die casting, metal injection molding, thin-wall injection molding, injection molding, 3D printing, reaction injection molding, or any other suitable method. Persons skilled in the art, upon reviewing the entirety of this disclosure, will be aware of various forms that molding and/or injection molding manufacturing may take consistently with the described methods and systems.

Figure 2:
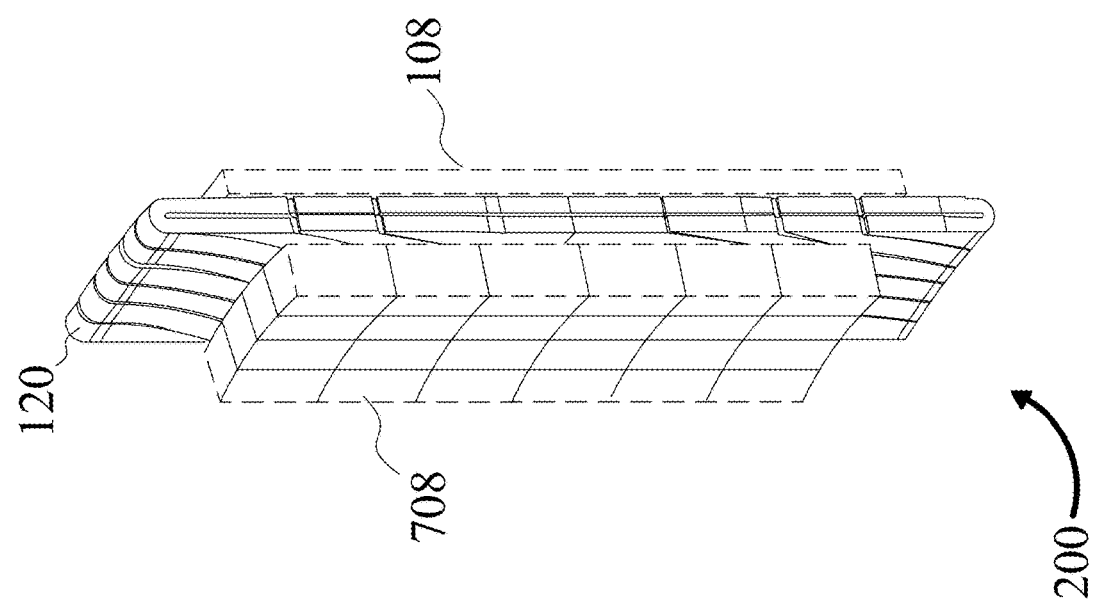
FIG. 2 is an embodiment of a stator assembly in partial isometric view.

Referring now to FIG. 2, an embodiment of stator assembly 200, which may be used as stator assembly 100 is presented. The plurality of winding sets 120 are shown in partial cross-sectional view. Additionally, outer cylindrical surface 108 is depicted. One of ordinary skill in the art would understand stator assembly 200 to be radially symmetric, taking the general shape of a hollow cylinder, and FIG. 2 is only a portion of said hollow cylinder, in other words, FIG. 2 is a sector of hollow cylinder.

Figure 3:
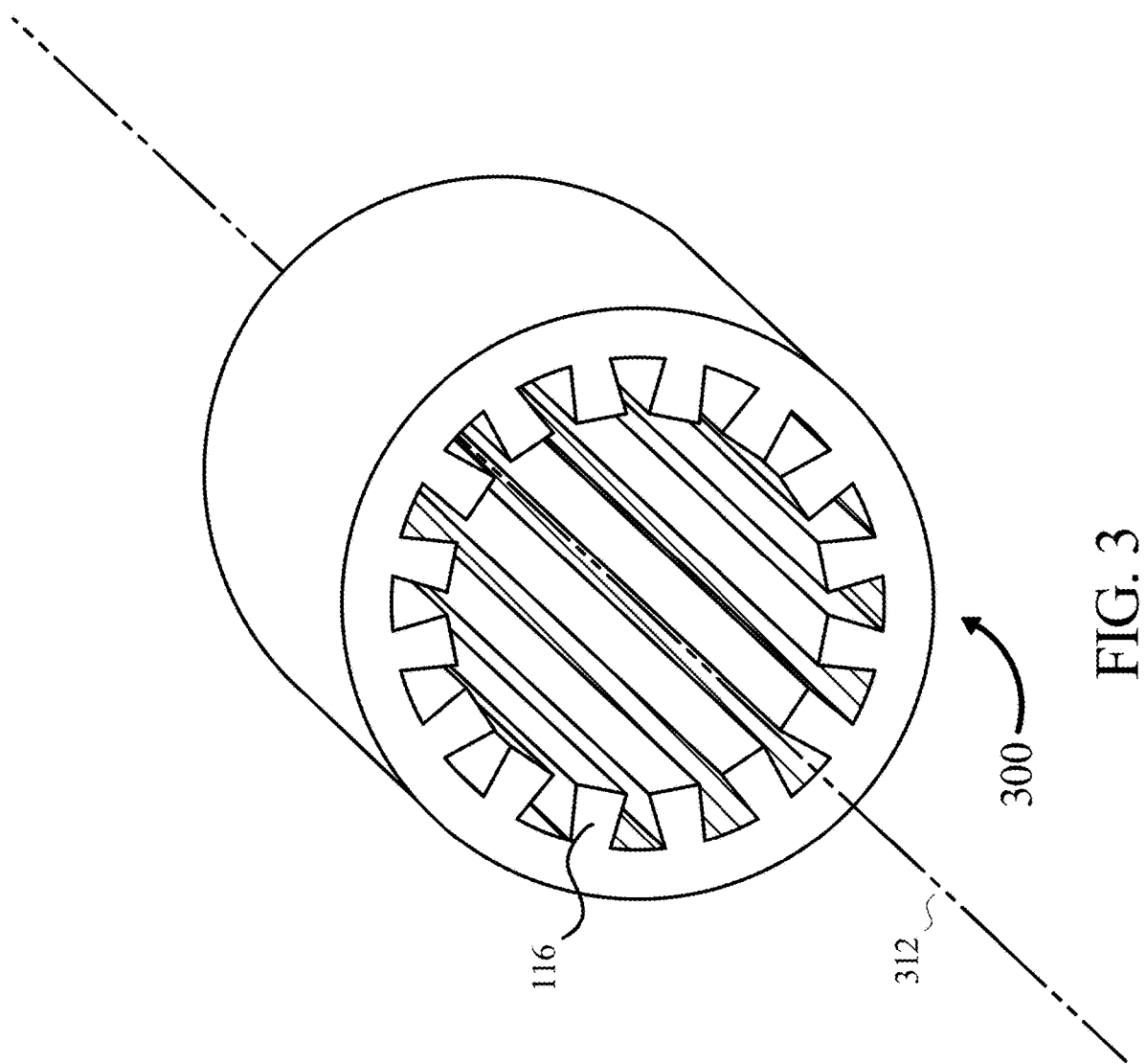
FIG. 3 is an embodiment of a stator and axis of rotation thereof in isometric view.

Referring now to FIG. 3, an embodiment of stator assembly 300 which may be used as stator assembly 100 or 200 is presented. Stator assembly 300 includes axis of rotation 312. Axis of rotation 312 is the common center of the plurality of radially symmetric elements presented in the disclosure. For example, axis of rotation 312 is virtually equidistant to every point on inner cylindrical surface 104 and virtually equidistant to every point on outer cylindrical surface 108. Axis of rotation 312 is coincident with the centerline hereinabove disclosed.

Referring again to FIG. 2, the plurality of modular winding sets 120 may include a plurality of segments of wire wound around two or more plurality of teeth 116. Due to the plurality of teeth 116 being disposed radially around inner cylindrical surface 104, a plurality of segments of wire may be turn around the plurality of teeth 116 that are not necessarily adjacent along inner cylindrical surface 104. Modular winding sets 120 include multiphase windings.

Additionally, each of the plurality of modular winding sets 120 may be provided electrical power by an individual inverter.

Referring again to FIG. 3, the at least a segment wound upon the plurality of teeth 116 is wound parallel to the axis of rotation of the stator such that the loops created by winding the segment of wire lie in a plane orthogonal to axis of rotation 312. Additionally, the at least a segment wound upon the plurality of teeth 116 may align the magnetic fields of the windings with the magnetic fields produced by the rotor shaft magnets. The plurality of modular winding sets 120 may include a fraction of stator assembly 100. Modular winding sets 120 may each include a subset of phases. Stator assembly 100 may include a regularly disposed amount of modular winding sets 120, where each modular winding set 120 may include one-fourth of the stator. In another non-limiting example, each modular winding set 120 may include another fraction of the stator, like one-eighth, one-sixteenth, or one-thirty-second, and so on. Alternatively, or additionally, the plurality of modular winding sets 120 may be disposed on the stator in a non-radially symmetric pattern. For example, one of the plurality of modular winding set 120 driven by an inverter may make up one-quarter of the stator, and another of the plurality of modular winding sets 120 driven by a second inverter may make up the other three-quarters of the stator.

Figure 4:
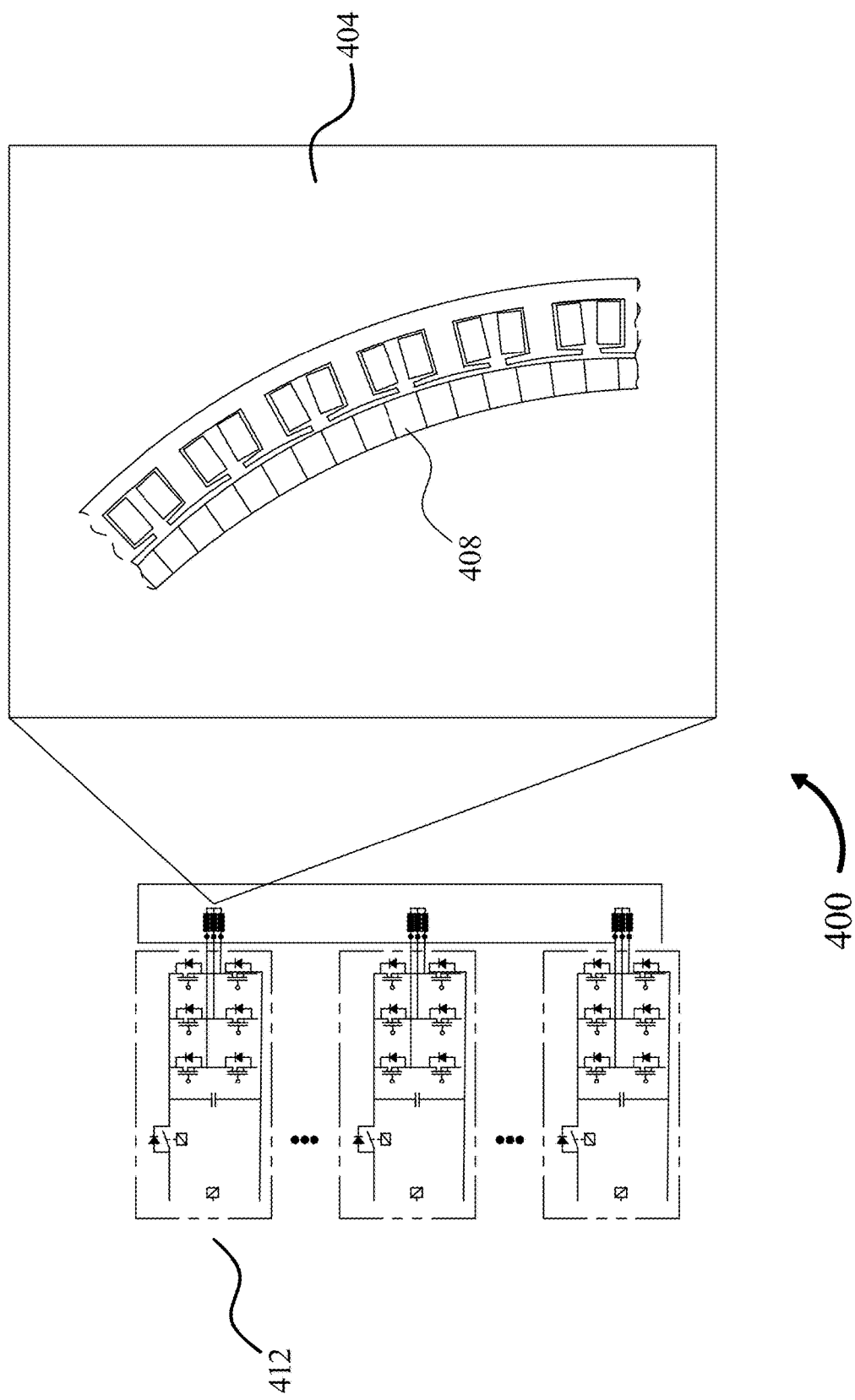
FIG. 4 is an embodiment of at least an inverter and a fraction of a stator assembly.

Now referring to FIG. 4, an embodiment of a fraction of stator assembly 100 and at least an inverter 412 providing electrical power therefor, herein power assembly 400 is presented. Stator fraction 404 may include a fraction of a stator which may be used as stator assembly 100 which was disclosed herein. Modular winding sets 120 are presented here planform view. Permanent magnet array 408 is presented in planform view. At least an inverter 412 may provide electrical power to stator fraction 404. The fraction of the stator assembly that stator fraction 404 may include may be any of the fractions herein disclosed or another undisclosed. The fraction of the stator assembly that the at least an inverter 412 powers may be configurable. For the purposes of this disclosure, configurable means that a user, a machine, a computer, or a combination thereof, may change or adjust the fraction of the stator, and more accurately, modular winding sets 120 that at least an inverter 412 provides electrical power to. One of ordinary skill in the art would appreciate the virtually limitless combination of inverters and modular winding sets that may be used in power assembly 400 and further in stator assembly 100. At least an inverter 412 may be disposed in or on at least a portion of stator assembly 100 or motor 800, discussed hereinbelow with reference to FIG. 8.

Figure 5:
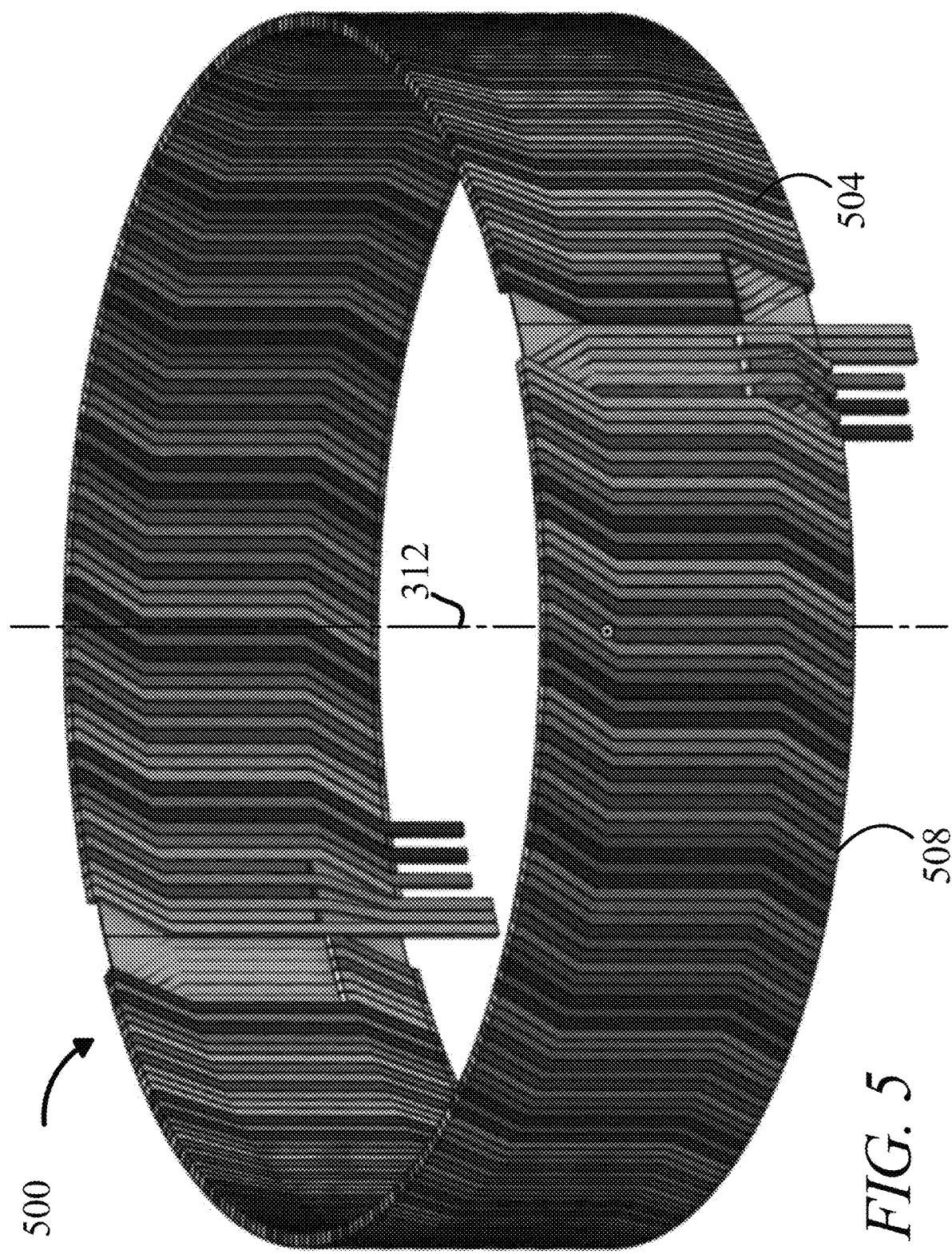
FIG. 5 is an embodiment of a stator and of a plurality of windings.

Referring now to FIG. 5, an embodiment of windings is presented. Windings 500 includes first winding 504 or second winding 508. Windings 500, first winding 504, second winding 508, or any of the phases thereof, may include Litz wires. Litz wires are a special type of multistrand wire or cable used in electronics to carry alternating current at radio frequencies. The wire is designed to reduce the skin effect and proximity effect losses in conductors at frequencies up to about 1 Megahertz (MHz). The skin effect of electrical conductors is the tendency of an alternating current to become distributed within a conductor such that the current density is largest near the surface of the conductor and decreases exponentially with greater depths in the conductor. Therefore, the electric current flows mostly at the "skin" of the conductor, or more accurately, the portion of the wire or conductor at the greatest radial distance from the center line or centroid of the conductor. The skin depth, or area of conductor that electric current flows through depends on the frequency of the alternating current. Litz wire can be used to mitigate the skin effect by weaving insulated wires together in a carefully designed pattern such that the magnetic field acts equally on all the wires and causes to the total current to be distributed equally among the wires. The woven insulated wires do not suffer the same increase in alternating current resistance that a solid conductor of the same cross-sectional area would be due to the skin effect. The proximity effect in electrical conductors is the tendency of nearby conductors to distribute current in smaller regions within the present conductors. The crowding of conductors near each other increases the effective resistance due to the smaller area current can flow through in a conductor, and the effective resistance increases with frequency. Litz wires mitigates the loss due to proximity effect by distributing conductive paths in an arrangement that reduces effective electromagnetic fields.

The at least a segment of electrically conductive material may include copper for example. Electrically conductive material may include any material that is conductive to electrical current and may include, as a nonlimiting example, various metals such as copper, steel, or aluminum, carbon conducting materials, or any other suitable conductive material. Persons skilled in the art, upon reviewing the entirety of this disclosure, will be aware of various forms of electrically conductive material that may be used as windings on a tooth consistent with the described methods and systems. Each winding of windings 500, or the plurality of modular winding sets 120 includes a plurality of turns. A turn as defined in this disclosure is a portion of a winding passing once around the plurality of teeth 116 or similar object, such as without limitation a portion that crosses a first surface of the plurality of teeth 116 or stator assembly 100, and then wraps around an edge, making an average angle that is an envelope of tangents to a first surface, and then crosses a second surface of the plurality of teeth 116. Each turn of the plurality of turns may traverse each a cylindrical surface, traversal refers to a winding spanning a cylindrical surface from a lower edge to an upper edge, or spanning from an upper edge to a lower edge; traversal may refer to a winding covering any cylindrical surface between edges, and over edges. Persons skilled in the art, upon reviewing the entirety of this disclosure, will be aware of various methods of winding electrical windings on the plurality of teeth 116 that may be consistent with the described methods and systems.

With continued reference to FIG. 2, modular winding sets 120, which include electrically conductive wires, may be wound upon the plurality of teeth 116 in a single layer. Modular winding set 120 may be wound upon the plurality of teeth 116 in a double layer. For the purposes of this disclosure, layers refer to a winding of at least a segment of electrically conductive material laying on the surface of the plurality of teeth 116. A single layer lays directly on and around the plurality of teeth 116, while the second layer (i.e. the double layer configuration) would lay on the single layer below it. One of ordinary skill in the art would understand a single layer of wound electrically conductive wire may effectively transmit electrical energy through said winding and produce a magnetic field. In an illustrative embodiment, a double layered electrical wire winding may include a cross-sectional arrangement that a second layer may lay in the groove created by two adjacent windings in a first single layer below it relative to the plurality of teeth 116. In another illustrative embodiment, a double layer may be disposed on a segment in the layer directly below it relative to at least the plurality of teeth 116.

Figure 6:
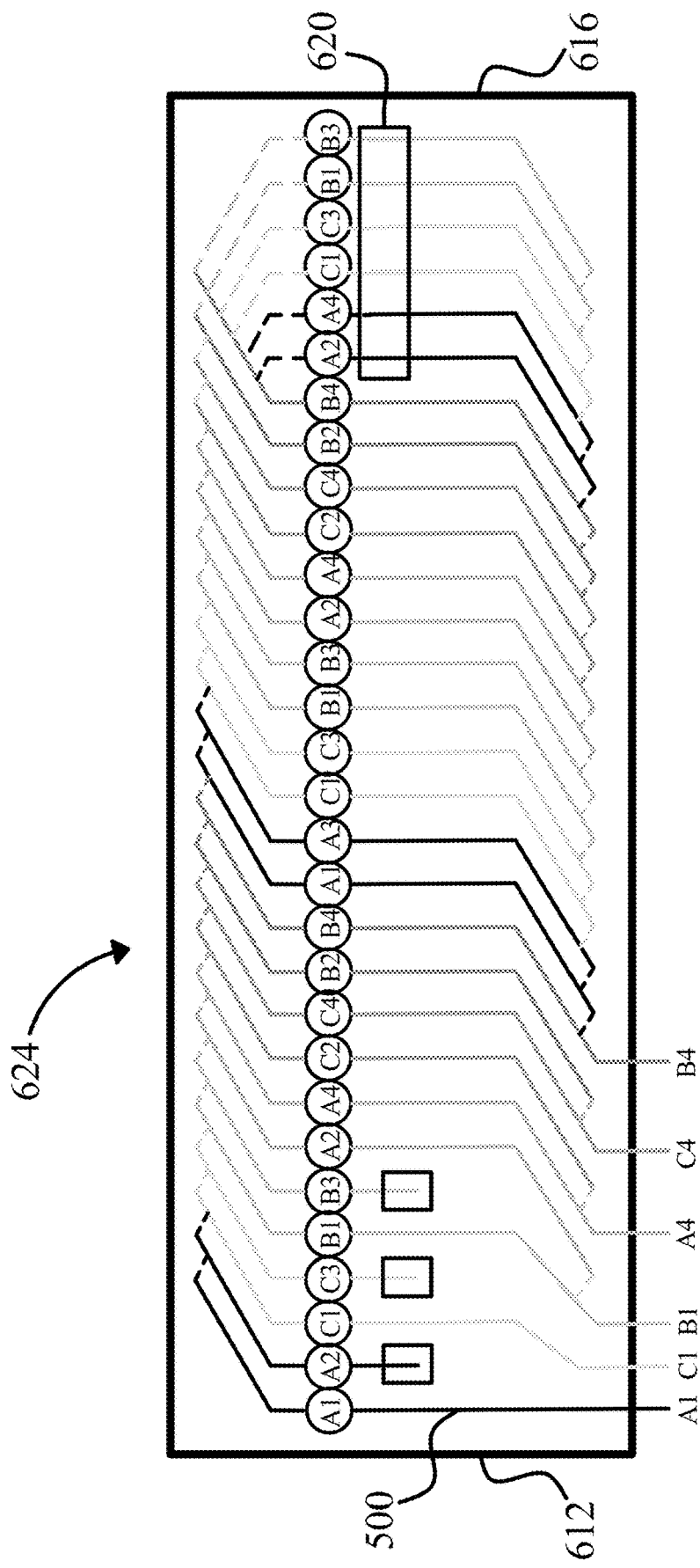
FIG. 6 is an embodiment of a schematic diagram of a plurality of windings.

Referring now to FIG. 6, a schematic diagram illustrates a portion of windings 500 on a stator half; a portion of windings 500 may be suitable for use as first winding 504 and/or second winding 508. First winding 504 may include a first phase (initially denoted A1) that may traverse a first set of channels from first end 612, to second end 616, passing through mandrel through-hole 620 at second end 616 (with first phase now denoted as A2). A2 now traverses a second set of channels back to the first end 612. A first phase may additionally pass through second mandrel through-hole 620 at first end 612 (after which first phase is denoted as A3 in FIG. 6), and traverse a third set of channels to second end 616, and may pass through third mandrel through-hole 620 at second end 616 (now denoted as A4), and traverses a fourth set of channels back to first end 612. First winding 504 may include at least a second phase electrically isolated from the first phase; as illustrated without limitation in FIG. 6 there may be three total phases (A1-4, B1-4, and C1-4). Alternatively, or additionally, there may be more than three total phases of windings, or less than three phases. First winding 504 may be connected to at least a first inverter to provide current to the winding. In nonlimiting illustrative embodiments, each half of mandrel 624 may have 3 phases, corresponding to a total of 6 windings, and therefore there may be 6 inverters connected to 6 windings. A second winding may include a second phase that traverses a fifth set of channels from a fourth end to a fourth through-hole at the third end, and then traverses a sixth set of channels back to the fourth end, as described in first winding 504 in FIG. 5. A third winding may include a third phase that traverses a fifth through hole at a fourth end, and may traverse a seventh set of channels to a second end, and may pass through a sixth through-hole at a third end, and traverse an eighth set of channels back to a fourth end. A second winding may include at least a fourth phase electrically isolated from the first three phases. Alternatively, or additionally, there may be a single phase, or any number of electrically isolated phases for a winding, and there may be a single winding or any number of windings A second winding is connected to at least a second inverter, and in non-limiting illustrative embodiments, each winding may be connected to at least its own inverter. Exemplary embodiments of inverters to which windings may connect are illustrated below for exemplary purposes; there may be any number of inverters and corresponding windings, including without limitation six inverters and six corresponding windings. An inverter, for the purposes of this disclosure, is a power electronic device or circuitry that changes direct current (DC) to alternative current (AC). An inverter (also called a power inverter) can be entirely electronic or may be a combination of mechanical effects (such as a rotary apparatus) and electronic circuitry. Alternatively, static inverters do not use moving parts in the conversion process. Inverters do not produce any power itself, rather it converts power produced by a DC power source. Inverters are often used in electrical power applications where high currents and voltages are present; circuits that perform the same function for electronic signals, which usually have very low currents and voltages, are called oscillators. Circuits that perform the opposite function, converting AC to DC, are called rectifiers.

Figure 7:
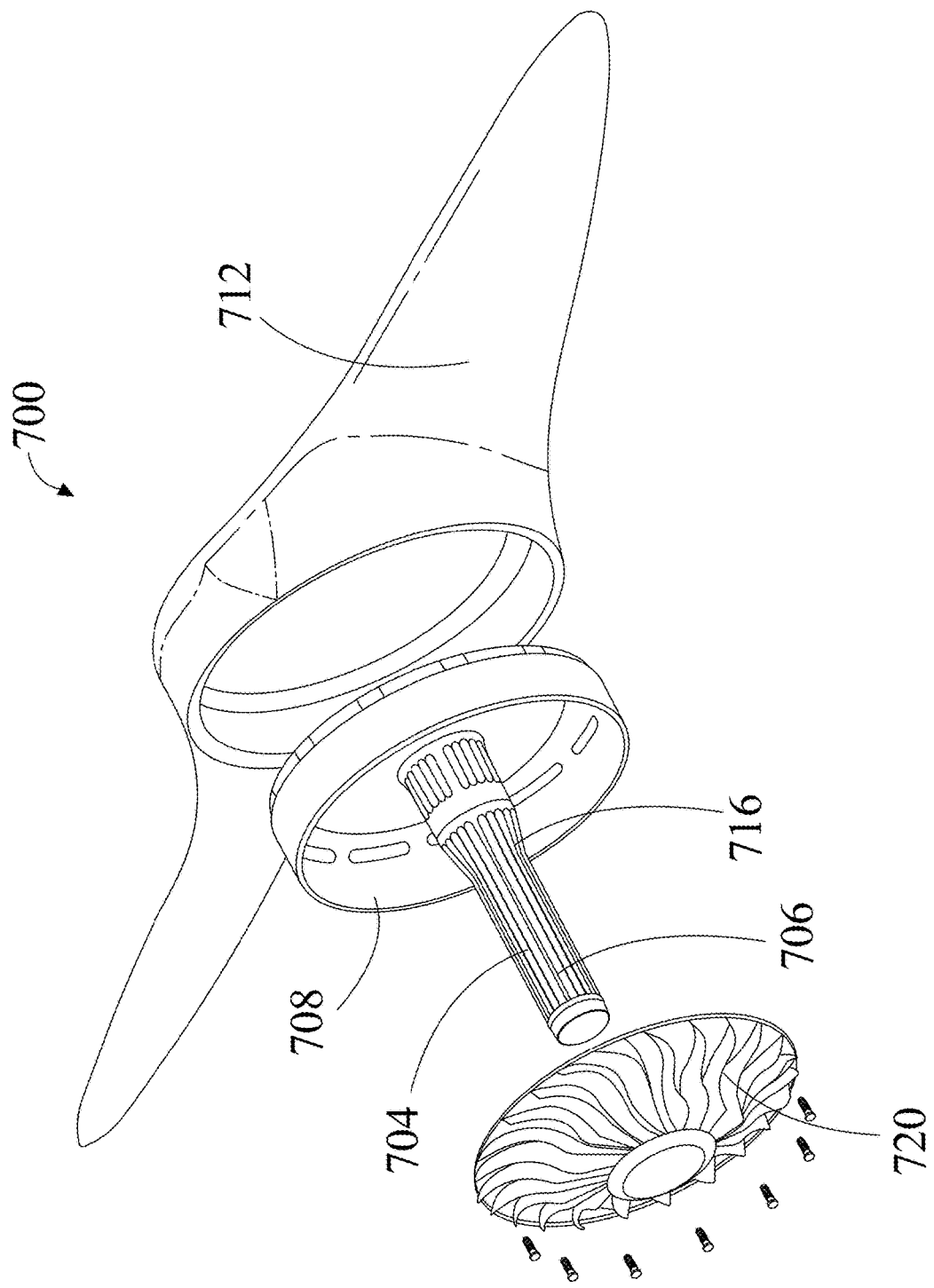
FIG. 7 is an embodiment of a rotor assembly used in an electric motor assembly.

Now referring to FIG. 7, rotor assembly 700 is presented. Rotor assembly 700 may include rotor shaft 704. The rotor shaft 704 may be disposed coaxially and coincidentally within stator assembly 100. Rotor shaft 704 may be rotatable relative to stationary stator assembly 100. Rotor shaft 704 may be mechanically coupled to stator assembly 100 within electric motor assembly hereinafter disclosed. Rotor shaft 704 may include cylindrical surface 716 disposed opposite and opposing to inner cylindrical surface 104 disposed on stator assembly 100. Rotor shaft 704 may include a plurality of permanent magnets, namely permanent magnet array 708, which may be similar to or the same as permanent magnet array 408, disposed radially about the axis of rotation of rotor shaft which is parallel and coincident with axis of rotation 312 of stator assembly 100. Permanent magnet array 708 may be disposed radially about the axis of rotation 312 equally spaced, continuously spaced, or any arrangement in an array about rotor shaft 704. Permanent magnet array 708 may include a Halbach array. A Halbach array is a special arrangement of permanent magnets that augments the magnetic field on one side of the array while canceling the field to near zero on the other side of the array. For the purposes of this disclosure, a side of the array is defined as an area disposed relative to the array of magnets, for example, if the Halbach array is disposed radially on the cylindrical surface of the rotor shaft, one side may be captured with the Halbach array, and a second side may be the area outside of the Halbach array. In general, the Halbach array is achieved by having a spatially rotating pattern of magnetization where the poles of successive magnets are not necessarily aligned and differ from one to the next. Orientations of magnetic poles may be repeated in patterns or in successive rows, columns, and arrangements. An array, for the purpose of this disclosure is a set, arrangement, or sequence of items, in this case permanent magnets. The rotating pattern of permanent magnets can be continued indefinitely and have the same effect, and may be arranged in rows, columns, or radially, in a non-limiting illustrative embodiment. One of ordinary skill in the art would appreciate that the area that the Halbach array augments the magnetic field of may be configurable or adjustable.

With continued reference to FIG. 7, rotor shaft 704 may be coupled at a first end to propulsor 712. Propulsor 712 may be similar or the same as any of the propulsors disclosed herein. There may be at least an air gap disposed between cylindrical surface 716 or magnet array 708 and inner cylindrical surface 104. Rotor shaft 704 may be mechanically coupled to impeller 720, which may be similar to or the same as any impeller disclosed herein. Motor 800 may include impeller 720 coupled with the rotor shaft 704. Impeller 720, as described herein, is a rotor used to increase or decrease the pressure and flow of a fluid, including at least air. Impeller 720 may function to provide cooling to rotor assembly 700 and motor 800. Impeller 720 may include varying blade configurations, such as radial blades, non-radial blades, semi-circular blades and airfoil blades. Impeller 720 may further include single and/or double-sided configurations. Impeller 720 is described in further detail below. Additionally, or alternatively, in a non-limiting illustrative example, rotor shaft 704 may be mechanically coupled to cooling vanes 706. Cooling vanes are used to lower the temperature of a high-velocity mechanical part, like the rotor in an electrical motor. Cooling vanes may employ a plurality of physical principles to cool mechanical parts. Cooling vanes may draw cool air like a fan if mechanically coupled to the rotor at an angle sufficient to create a pressure differential in order to draw cool air from outside the motor housing into the relatively hot inner motor and cool internal mechanical parts by convection. Convection cooling in principle, is cooling of a portion of a body by moving a fluid over it, the tendency of heat energy to move from high to low energy areas, like a hot spinning rotor to cool moving air. Additionally, cooling vanes may act as thermodynamic fins. Heat energy may be conducted through the cooling vanes from the hot rotor shaft to the tips of the cooling vanes, thus dissipating heat in a high-speed rotating part.

Figure 8:
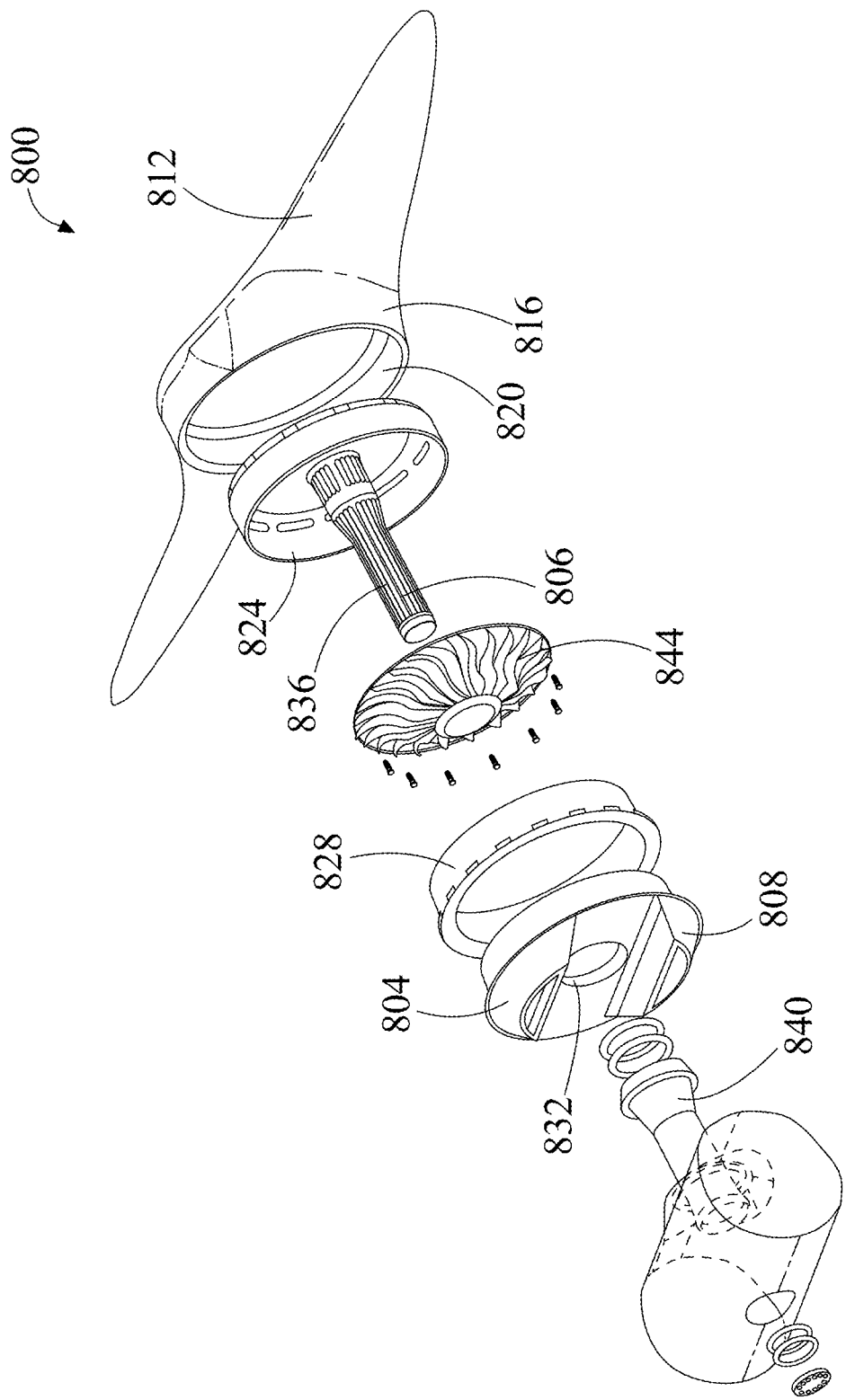
FIG. 8 is an illustration of an exploded view of an electric motor in a propulsion assembly.

Referring now to FIG. 8, an embodiment of motor 800 is illustrated. Motor 800 may include at least a stator 804. Stator 804, as used herein, is a stationary component of a motor and/or motor assembly. In an embodiment, stator 804 may include at least first magnetic element 808. As used herein, first magnetic element 808 is an element that generates a magnetic field. For example, first magnetic element 808 may include one or more magnets which may be assembled in rows along a structural casing component. Further, first magnetic element 808 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. First magnetic element 808 may act to produce or generate a magnetic field to cause other magnetic elements to rotate, as described in further detail below. Stator 804 may include a frame to house components including first magnetic element 808, as well as one or more other elements or components as described in further detail below. In an embodiment, a magnetic field may be generated by first magnetic element 808 and can include a variable magnetic field. In embodiments, a variable magnetic field may be achieved by use of an inverter, a controller, or the like. In an embodiment, stator 804 may have an inner and outer cylindrical surface; a plurality of magnetic poles may extend outward from the outer cylindrical surface of the stator. In an embodiment, stator 804 may include an annular stator, wherein the stator is ring-shaped. In an embodiment, stator 804 is incorporated into a DC motor where stator 804 is fixed and functions to supply the magnetic fields where a corresponding rotor, as described in further detail below, rotates. In an embodiment, stator 804 may be incorporated an AC motor where stator 804 is fixed and functions to supply the magnetic fields by radio frequency electric currents through an electromagnet to a corresponding rotor, as described in further detail below, rotates.

Still referring to FIG. 8, motor 800 may include propulsor 812. In embodiments, propulsor 812 may include an integrated rotor. As used herein, a rotor is a portion of an electric motor that rotates with respect to a stator of the electric motor, such as stator 804. A propulsor, as used herein, is a component or device used to propel a craft by exerting force on a fluid medium, which may include a gaseous medium such as air or a liquid medium such as water. Propulsor 812 may be any device or component that consumes electrical power on demand to propel an aircraft or other vehicle while on ground and/or in flight. Propulsor 812 may include one or more propulsive devices. In an embodiment, propulsor 812 may include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like. In an embodiment, propulsor 812 may include at least a blade. Persons skilled in the art, upon reviewing the entirety of this disclosure, will be aware of various devices that may be used as propulsor 812. In an embodiment, when a propulsor twists and pulls air behind it, it will, at the same time, push the aircraft forward with an equal amount of force. The more air pulled behind the aircraft, the more the aircraft is pushed forward. In an embodiment, thrust element may include a helicopter rotor incorporated into propulsor 812. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

Continuing to refer to FIG. 8, in an embodiment, propulsor 812 may include hub 816 rotatably mounted to stator 804. Rotatably mounted, as described herein, is functionally secured in a manner to allow rotation. Hub 816 is a structure which allows for the mechanically coupling of components of the integrated rotor assembly. In an embodiment, hub 816 can be mechanically coupled to propellers or blades. In an embodiment, hub 816 may be cylindrical in shape such that it may be mechanically joined to other components of the rotor assembly. Hub 816 may be constructed of any suitable material or combination of materials, including without limitation metal such as aluminum, titanium, steel, or the like, polymer materials or composites, fiberglass, carbon fiber, wood, or any other suitable material. Hub 816 may move in a rotational manner driven by interaction between stator and components in the rotor assembly. Persons skilled in the art, upon reviewing the entirety of this disclosure, will be aware of various structures that may be used as or included as hub 816, as used and described herein.

Still referring to FIG. 8, in an embodiment, propulsor 812 and/or rotor shaft 836 may include second magnetic element 820, which may include one or more further magnetic elements. Second magnetic element 820 generates a magnetic field designed to interact with first magnetic element 808. Second magnetic element 820 may be designed with a material such that the magnetic poles of at least a second magnetic element are oriented in an opposite direction from first magnetic element 808. In an embodiment, second magnetic element 820 may be affixed to hub 816, rotor shaft 836, or another rotating or stationary electric motor component disclosed herein. Affixed, as described herein, is the attachment, fastening, connection, and the like, of one component to another component. For example, and without limitation, affixed may include bonding the second magnetic element 820 to hub 816, such as through hardware assembly, spot welding, riveting, brazing, soldering, glue, and the like. Second magnetic element 820 may include any magnetic element suitable for use as first magnetic element 808. For instance, and without limitation, second magnetic element may include a permanent magnet and/or an electromagnet. Second magnetic element 820 may include magnetic poles oriented in a second direction opposite, in whole or in part, of the orientation of the poles of first magnetic element 808. In an embodiment, motor 800 may include a motor assembly incorporating stator 804 with a first magnet element and second magnetic element 820. First magnetic element 808 may include magnetic poles oriented in a first direction, a second magnetic element includes a plurality of magnetic poles oriented in the opposite direction than the plurality of magnetic poles in the first magnetic element 808.

Referring again to FIG. 8, in an embodiment, first magnetic element 808 may be a productive element, defined herein as an element that produces a varying magnetic field. Productive elements may produce magnetic field that may attract and other magnetic elements, possibly including a receptive element. Second magnetic element may be a productive or receptive element. A receptive element may react due to the magnetic field of first magnetic element 808. In an embodiment, first magnetic element 808 may produce a magnetic field according to magnetic poles of first magnetic element 808 oriented in a first direction. Second magnetic element 820 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 816 and rotor assembly may both be cylindrical in shape where rotor may have a slightly smaller circumference than hub 816 to allow the joining of both structures. Coupling of hub 816 to stator 804 may be accomplished via a surface modification of either hub 816, stator 804 or both to form a locking mechanism. Coupling may be accomplished using additional nuts, bolts, and/or other fastening apparatuses. In an embodiment, an integrated rotor assembly as described above may reduce profile drag in forward flight for an electric aircraft. Profile drag may be caused by a number of external forces that the aircraft is subjected to. In an embodiment, incorporating propulsor 812 into hub 816, may reduce a profile of motor 800 resulting in a reduced profile drag. In an embodiment, the rotor, which may include motor inner magnet carrier 824, motor outer magnet carrier 828, propulsor 812 may be incorporated into hub 816. In an embodiment, inner motor magnet carrier 824 may rotate in response to a magnetic field. The rotation may cause hub 816 to rotate. This unit may be inserted into motor 800 as one unit. This may enable ease of installation, maintenance, and removal.

Still referring to FIG. 8, stator 804 may include through-hole 832. Through-hole 832 may provide an opening for a component to be inserted through to aid in attaching propulsor with integrated rotor and rotor shaft to stator. In an embodiment, through-hole 832 may have a round or cylindrical shape and be located at a rotational axis of stator 804, which in an embodiment may be similar to or the same as axis of rotation 312. Hub 816 may be mounted to stator 804 by means of rotor shaft 836 rotatably inserted though through-hole 832. The rotor shaft 836 may be mechanically coupled to stator 804 such that rotor shaft 836 is free to rotate about its centerline axis, which may be effectively parallel and coincident to stator's centerline axis, and further the rotor shaft and stator may include a void of empty space between them, where at least a portion the outer cylindrical surface of the rotor shaft is not physically contacting at least a portion of the inner cylindrical surface of the stator. This void may be filled, in whole or in part, by air, a vacuum, a partial vacuum or other gas or combination of gaseous elements and/or compounds, to name a few. Through-hole 832 may have a diameter that is slightly larger than a diameter of rotor shaft 836 to allow rotor shaft 836 to fit through through-hole 832 to connect stator 804 to hub 816. Rotor shaft 836 may rotate in response to rotation of propulsor 812.

Still referring to FIG. 8, motor 800 may include a bearing cartridge 840. Bearing cartridge 840 may include a bore. Rotor shaft 836 may be inserted through the bore of bearing cartridge 840. Bearing cartridge 840 may be attached to a structural element of a vehicle. Bearing cartridge 840 functions to support the rotor and to transfer the loads from the motor. Loads may include, without limitation, weight, power, magnetic pull, pitch errors, out of balance situations, and the like. Bearing cartridge 840 may include a bore. Bearing cartridge 840 may include a smooth metal ball or roller that rolls against a smooth inner and outer metal surface. The rollers or balls take the load, allowing the device to spin. a bearing may include, without limitation, a ball bearing, a straight roller bearing, a tapered roller bearing or the like. Bearing cartridge 840 may be subject to a load which may include, without limitation, a radial or a thrust load. Depending on the location of bearing cartridge 840 in the assembly, it may see all of a radial or thrust load or a combination of both. In an embodiment, bearing cartridge 840 may join motor 800 to a structure feature. Bearing cartridge 840 may function to minimize the structural impact from the transfer of bearing loads during flight and/or to increase energy efficiency and power of propulsor. Bearing cartridge 840 may include a shaft and collar arrangement, wherein a shaft affixed into a collar assembly. A bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are balls or rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 840 may act to keep propulsor 812 and components intact during flight by allowing motor 800 to rotate freely while resisting loads such as an axial force. In an embodiment, bearing cartridge 840 may include a roller bearing incorporated into the bore. a roller bearing is in contact with rotor shaft 836. Stator 804 may be mechanically coupled to inverter housing. Mechanically coupled may include a mechanical fastening, without limitation, such as nuts, bolts or other fastening device. Mechanically coupled may include welding or casting or the like. Inverter housing may contain a bore which allows insertion by rotor shaft 836 into bearing cartridge 840.

Still referring to FIG. 8, motor 800 may include a motor assembly incorporating a rotating assembly and a stationary assembly. Hub 816, motor inner magnet carrier 824 and rotor shaft 836 may be incorporated into the rotor assembly of motor 800 which make up rotating parts of electric motor, moving between the stator poles and transmitting the motor power. As one integrated part, the rotor assembly may be inserted and removed in one piece. Stator 804 may be incorporated into the stationary part of the motor assembly. Stator and rotor may combine to form an electric motor. In embodiment, an electric motor may, for instance, incorporate coils of wire, which may be similar to or the same as any of the electrically conductive components in the entirety of this disclosure, which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example, and without limitation, first magnetic element 808 in motor 800 may include an active magnet. For instance, and without limitation, a second magnetic element may include a passive magnet, a magnet that reacts to a magnetic force generated by first magnetic element 808. In an embodiment, a first magnet positioned around the rotor assembly, may generate magnetic fields to affect the position of the rotor relative to the stator 804. A controller may have an ability to adjust electricity originating from a power supply and, thereby, the magnetic forces generated, to ensure stable rotation of the rotor, independent of the forces induced by the machinery process.

Motor 800 may include impeller 844, which may be used as impeller 720, coupled with the rotor shaft 836. An impeller, as described herein, is a rotor used to increase or decrease the pressure and flow of a fluid, including at least air. Impeller 844 may function to provide cooling to motor 800. Impeller 844 may include varying blade configurations, such as radial blades, non-radial blades, semi-circular blades and airfoil blades. Impeller 844 may further include single and/or double-sided configurations. Impeller 844 is described in further detail below. Additionally, or alternatively, in a non-limiting illustrative example, rotor shaft 836 may be mechanically coupled to cooling vanes 806. Cooling vanes are used to lower the temperature of a high-velocity mechanical part, like the rotor in an electrical motor. Cooling vanes may employ a plurality of physical principles to cool mechanical parts. Cooling vanes may draw cool air like a fan if mechanically coupled to the rotor at an angle sufficient to create a pressure differential in order to draw cool air from outside the motor housing into the relatively hot inner motor and cool internal mechanical parts by convection. The cooling vanes may alternatively or additionally cool other components disclosed herein with the impeller. Convection cooling in principle, is cooling of a portion of a body by moving a fluid over it, the tendency of heat energy to move from high to low energy areas, like a hot spinning rotor to cool moving air. Additionally, cooling vanes may act as thermodynamic fins. Heat energy may be conducted through the cooling vanes from the hot rotor shaft to the tips of the cooling vanes, thus dissipating heat in a high-speed rotating part. Cooling vanes may be consistent with those disclosed in U.S. patent application Ser. No. 16/910,255 entitled "Integrated Electric Propulsion Assembly" and incorporated herein by reference in its entirety.

Figure 9:
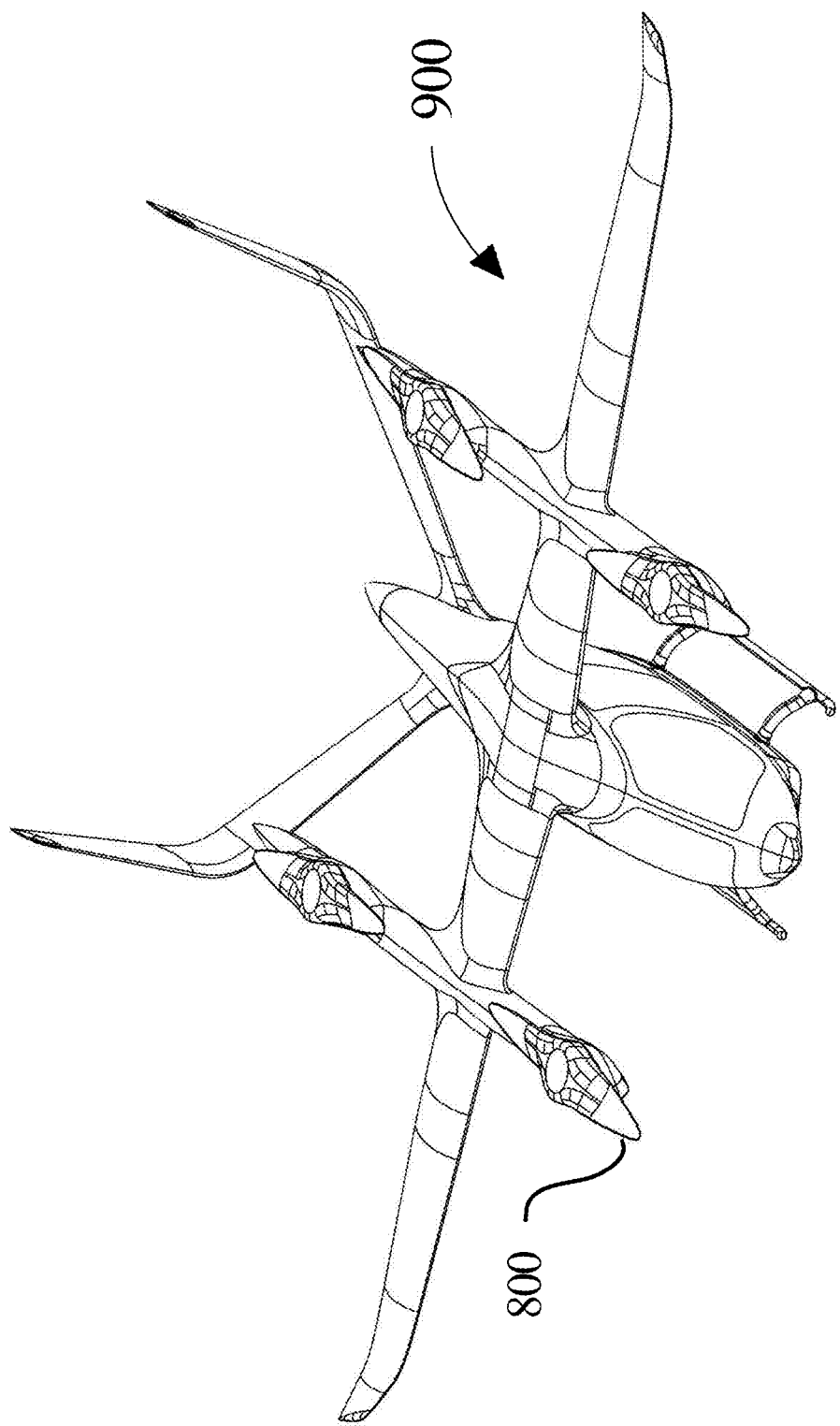
FIG. 9 is an embodiment of an integrated motor incorporated in an electric aircraft.

Now referring to FIG. 9, electric aircraft 900 may include motor 800 may be mounted on a structural feature of an aircraft. Design of motor 800 may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge. Further, a structural feature may include a component of electric aircraft 900. For example, and without limitation structural feature may be any portion of a vehicle incorporating motor 800, including any vehicle as described below. As a further non-limiting example, a structural feature may include without limitation a wing, a spar, an outrigger, a fuselage, or any portion thereof persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 812. Persons skilled in the art, upon reviewing the entirety of this disclosure, will be aware of various materials, combinations of materials, and/or constructions techniques.

Still referring to FIG. 9, electric aircraft 900 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 9, a number of aerodynamic forces may act upon the electric aircraft 900 during flight. Forces acting on electric aircraft 900 during flight may include, without limitation, thrust, the forward force produced by the rotating element of the electric aircraft 900 and acts parallel to the longitudinal axis. Another force acting upon electric aircraft 900 may be, without limitation, drag, which may be defined as a rearward retarding force which is caused by disruption of airflow by any protruding surface of the electric aircraft 900 such as, without limitation, the wing, rotor, and fuselage. Drag may oppose thrust and acts rearward parallel to the relative wind. A further force acting upon electric aircraft 900 may include, without limitation, weight, which may include a combined load of the electric aircraft 900 itself, crew, baggage, and/or fuel. Weight may pull electric aircraft 900 downward due to the force of gravity. An additional force acting on electric aircraft 900 may include, without limitation, lift, which may act to oppose the downward force of weight and may be produced by the dynamic effect of air acting on the airfoil and/or downward thrust from the propulsor 812 of the electric aircraft. Lift generated by the airfoil may depend on speed of airflow, density of air, total area of an airfoil and/or segment thereof, and/or an angle of attack between air and the airfoil. For example, and without limitation, electric aircraft 900 are designed to be as lightweight as possible. Reducing the weight of the aircraft and designing to reduce the number of components is essential to optimize the weight. To save energy, it may be useful to reduce weight of components of electric aircraft 900, including without limitation propulsors and/or propulsion assemblies. In an embodiment, motor 800 may eliminate need for many external structural features that otherwise might be needed to join one component to another component. Motor 800 may also increase energy efficiency by enabling a lower physical propulsor profile, reducing drag and/or wind resistance. This may also increase durability by lessening the extent to which drag and/or wind resistance add to forces acting on electric aircraft 900 and/or propulsors.

Still referring to FIG. 9, electric aircraft 900 can include motor 800. Motor 800 may include a stator which has a first magnetic generating element generating a first magnetic field. Motor 8 may also include propulsor 812 with an integrated rotor assembly of the motor assembly which may include includes a hub mounted to stator, at least a second magnetic element generating a second magnetic field. First magnetic field and second magnetic field vary with respect to time which generates a magnetic force between both causing the rotor assembly to rotate with respect to the stator.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
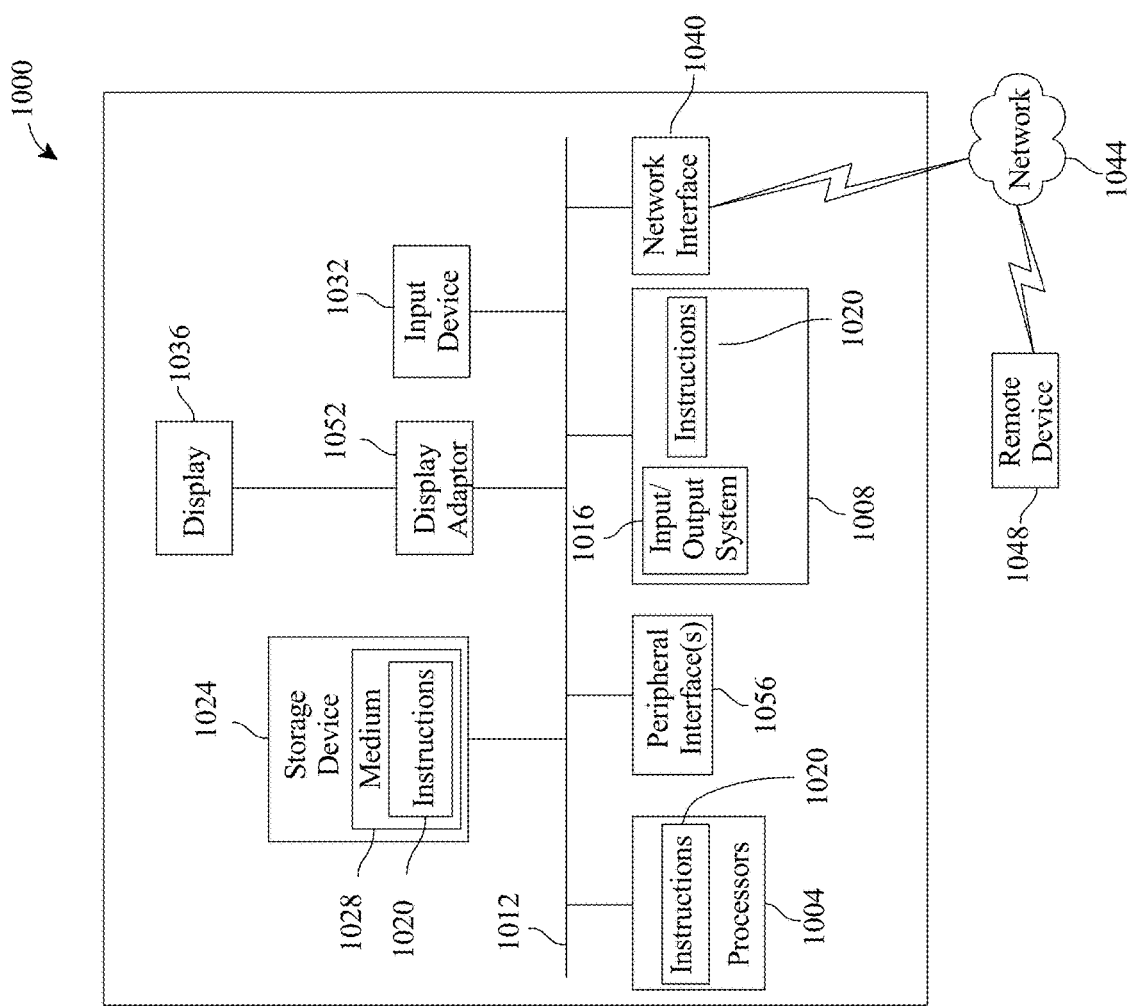
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system, such as the integrated motor 800 system of FIG. 8, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1094 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system. 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A fractional slot concentrated motor for electric aircraft, the motor comprising:
   a stator, the stator comprising:
      an inner cylindrical surface and outer cylindrical surface, wherein:
         the inner cylindrical surface and outer cylindrical surface are coaxial about an axis of rotation;
         the inner cylindrical surface has a first radius and the outer cylindrical surfaces has a second radius; and
         the first radius is different from the second radius;
      a plurality of teeth disposed on the inner cylindrical surface and extending radially inward, wherein each tooth of the plurality of teeth has a cross-sectional area, the cross-sectional area increasing as the tooth extends further from the inner cylindrical surface;
      a plurality of modular winding sets, each of the plurality of modular winding sets comprising at least a segment of electrically conductive material wound upon at least a tooth of the plurality of teeth and wherein the plurality of modular winding sets are disposed on the stator in a non-radially symmetric pattern;
   at least an inverter, wherein:
      the at least an inverter provides electrical power to at least a portion of the stator; and
      the at least an inverter provides electrical power to a configurable portion of the stator;
   a rotor shaft at the axis of rotation, the rotor shaft disposed coaxially within the inner cylindrical surface and rotatable relative to the stator, the rotor shaft comprising;
      a cylindrical surface facing the inner cylindrical surface of the stator;
      a plurality of permanent magnets mechanically coupled to rotor shaft;
      a first end mechanically coupled to a propulsor; and
      a plurality of cooling vanes disposed on the rotor shaft, wherein the plurality of cooling vanes lower a temperature of the rotor shaft; and at least an air gap disposed between the cylindrical surface of the rotor shaft and the inner cylindrical surface of the stator.

2. The motor of claim 1, wherein the stator includes a through-hole.

3. The motor of claim 1, wherein the plurality of permanent magnets comprises a Halbach array.

4. The motor of claim 1, wherein the permanent magnets augment a magnetic field located within a portion of the stator.

5. The motor of claim 1, wherein the permanent magnets negate a magnetic field located within a portion of the stator.

6. The motor of claim 1, wherein each of the plurality of modular winding sets comprise one-eighth of the stator.

7. The motor of claim 1, wherein each of the plurality of modular windings sets comprises a one-fourth of the stator.

8. The motor of claim 1, wherein each of plurality of modular winding sets includes a plurality of segments of wire wound around two or more of the plurality of teeth.

9. The motor of claim 1, wherein the at least a segment wound around at least a tooth is parallel to the axis of rotation.

10. The motor of claim 1, wherein the at least a segment wound around at least a tooth align the magnetic fields of the windings with the magnetic fields produced by the rotor shaft magnets.

11. The motor of claim 1, wherein the each of the plurality of modular winding sets is driven by an individual power inverter.

12. The motor of claim 1, wherein at least a portion of the stator is attached to an electric aircraft.

13. The motor of claim 1, wherein the stator comprises a hollow cylinder.

14. The motor of claim 1, wherein the plurality of modular winding sets further comprise a plurality of multiphase windings.

15. The motor of claim 1, wherein the at least a segment is wound upon at least a tooth in a single layer.

16. The motor of claim 1, wherein the at least a segment is wound upon at least a tooth in a double layer.

17. The motor of claim 1, wherein at least a tooth is integral to the stator.

18. The motor of claim 1, wherein the at least a segment of electrically conductive material wound upon at least a tooth comprises Litz wires.

19. The motor of claim 1, wherein the at least an inverter is disposed on or in at least a portion of the stator.

20. The motor of claim 1, wherein the rotor shaft comprises an impeller.

* * * * *